(12) United States Patent
Jaworowski et al.

(10) Patent No.: US 7,972,533 B2
(45) Date of Patent: Jul. 5, 2011

(54) CHROMATE FREE WATERBORNE CORROSION RESISTANT PRIMER WITH NON-CARCINOGENIC CORROSION INHIBITING ADDITIVE

(75) Inventors: Mark R. Jaworowski, Glastonbury, CT (US); Promila P. Bhaatia, Farmington, CT (US)

(73) Assignee: United Technologies Corporation, Hartford, CT (US)

( * ) Notice: Subject to any disclaimer, the term of this patent is extended or adjusted under 35 U.S.C. 154(b) by 541 days.

(21) Appl. No.: 11/397,088

(22) Filed: Apr. 4, 2006

(65) Prior Publication Data
US 2007/0228332 A1    Oct. 4, 2007

(51) Int. Cl.
*C23F 11/00* (2006.01)
*C04B 9/02* (2006.01)

(52) U.S. Cl. .............. 252/387; 106/14.11; 106/14.41; 106/14.44; 524/406; 524/408

(58) Field of Classification Search .............. 252/387; 524/430, 434, 406, 408; 523/404, 414, 416; 428/472; 106/14.11, 14.41, 14, 44
See application file for complete search history.

(56) References Cited

U.S. PATENT DOCUMENTS

| | | | |
|---|---|---|---|
| 2,387,528 A | 10/1945 | Patterson et al. | |
| 2,430,589 A | 11/1947 | Sloan | |
| 2,902,394 A | 9/1959 | Jeremias | |
| 3,063,877 A | 11/1962 | Schiffman | |
| 3,279,958 A | 10/1966 | Maurer et al. | |
| 5,688,560 A * | 11/1997 | Honda et al. | 427/341 |
| 6,168,868 B1 | 1/2001 | Hauser et al. | |
| 6,228,437 B1 | 5/2001 | Schmidt | |
| 6,758,887 B2 * | 7/2004 | Bhatia | 106/14.44 |
| 6,887,321 B2 | 5/2005 | Parkos, Jr. et al. | |
| 2004/0249043 A1* | 12/2004 | Stoffer et al. | 524/430 |
| 2004/0262580 A1* | 12/2004 | Yu et al. | 252/389.1 |
| 2005/0209117 A1 | 9/2005 | Friedrich et al. | |
| 2007/0256592 A1 | 11/2007 | Shimoda et al. | |

FOREIGN PATENT DOCUMENTS

| | | |
|---|---|---|
| EP | 1788051 | 5/2007 |
| JP | 11036079 A | 2/1999 |
| JP | 2001081392 A | 3/2001 |
| WO | 0120058 A1 | 3/2001 |
| WO | 0146495 | 6/2001 |
| WO | 04001099 | 12/2003 |

OTHER PUBLICATIONS

European Notice of Opposition for Application No. 07251482.1 / Patent No. 1842881 dated Jun. 9, 2010.
European Search Report, Jul. 24, 2007.

* cited by examiner

*Primary Examiner* — Ling-Siu Choi
*Assistant Examiner* — Bijan Ahvazi
(74) *Attorney, Agent, or Firm* — Bachman & LaPointe, P.C.

(57) ABSTRACT

A waterborne corrosion resistant primer composition is composed of a waterborne resin system; an optional curing agent; and a non-chromate containing corrosion inhibiting additive. The non-chromate corrosion inhibiting additive includes at least one of an anodic corrosion inhibitor, a cathodic corrosion inhibitor and a metal complexing agent. The metal complexing agent increases the solubility of at least one of the anodic and cathodic corrosion inhibitors.

22 Claims, No Drawings

CHROMATE FREE WATERBORNE CORROSION RESISTANT PRIMER WITH NON-CARCINOGENIC CORROSION INHIBITING ADDITIVE

FIELD OF THE INVENTION

The present invention relates to a corrosion resistant primer and, more particularly, to a chromate free, waterborne corrosion resistant primer.

BACKGROUND OF THE INVENTION

Corrosion inhibitive compounds have long been used on, for example, metallic surfaces to inhibit corrosion thereof. U.S. Pat. No. 2,387,528 describes alkali earth metal chromates containing trivalent as well as hexavalent chromium as additives for metal protective pigments. U.S. Pat. No. 2,430,589 describes protective pigments comprising calcium chromate associated with minor additions of ferric, manganic or chromic oxides. U.S. Pat. No. 2,902,394 describes the use of soluble chromium containing compounds used in aqueous metal treating or rinsing solutions applied to metal surfaces or to the conversion coating onto metal surfaces to improve corrosion resistance. U.S. Pat. No. 3,063,877 describes aqueous solutions for treating metal surfaces to, in part, improve corrosion resistance, which are prepared by partially reducing a dissolved hexavalent chromium compound with formaldehyde. U.S. Pat. No. 3,279,958 describes rinsing of phosphate, chromate and other chemical conversion coatings on metal surfaces with a dilute aqueous acid solution of a chromium chromate complex followed by a water rinse. The complex is prepared by treating aqueous chromic acid solution with an organic reducing agent to reduce a portion of the hexavalent chromium to the trivalent state.

In the aerospace industry, aluminum alloys achieve their high strength to weight ratio by inclusion of such additional elements as copper, silicon, chromium, manganese, zinc and magnesium. The presence of these elements in high strength aluminum alloys make them more susceptible to corrosion attack than pure aluminum. These high strength aluminum alloys are, therefore, generally protected in service by use of corrosion inhibitive compounds based on hexavalent chromium. These compounds include barium or strontium chromate particles used as inhibitive pigments in adhesives, paints and primers; chromic acid, which is used to produce a chromium rich conversion coating; and sodium and potassium dichromate, which are used as sealing compounds for anodized films.

Structural alloys, including alloys of aluminum, steel, etc, are commonly used in aerospace, marine, auto and other applications. Generally, these alloys are protected against corrosion by applying primers or organic coatings containing corrosion inhibitors. Typically, the corrosion resistant primers used for the structural alloys are solvent based epoxy primers which employ hexavalent chromium as an active corrosion inhibitor pigment additive. These primers rely on the hexavalent chromium for corrosion protection. All forms of hexavalent chromium are recognized by the United States National Institute of Environmental Health Sciences as a Group I known human carcinogen. In addition, again with the enactment of federal and state legislation to reduce hexavalent chromium volatile organic content (VOC) levels in paints and primers, considerable attention has been given to waterborne and/or water-reducible resin binders. Accordingly, corrosion inhibiting compounds, which contain forms of hexavalent chromium, and their use are subject to stringent regulation and control. It would be very beneficial to eliminate hexavalent chromium as a corrosion inhibiting additive to such primers.

All forms of hexavalent chromium are recognized by the United States National Institute of Environmental Health Sciences as a Group 1 known human carcinogen. Accordingly, corrosion inhibiting compounds, which contain forms of hexavalent chromium, and their use, are subject to stringent regulation and control. It would be very beneficial to eliminate hexavalent chromium as a component of corrosion inhibitive primer compositions as described above.

Naturally, it would be highly desirable to provide corrosion inhibitors which can be used and substituted for hexavalent chromium inhibitors so as to avoid potential health hazards while at the same time provide effective corrosion protection on metal surfaces, particularly, high strength aluminum alloys used in aerospace applications.

Accordingly, it is the principle object of the present invention to provide a chromate free, waterborne corrosion resistant primer which is non-carcinogenic.

It is a particular object of the present invention to provide a chromate free, waterborne corrosion resistant primer which is effective in preventing corrosion attack on metals.

It is a further object of the present invention to provide a chromate free, waterborne corrosion resistant primer which is particularly effective when applied to any number of families of alloys, e.g., aluminum, iron, magnesium, stainless steel, etc., known to one of ordinary skill in the art.

It is a still further object of the present invention to provide a chromate free, waterborne corrosion resistant primer which is effective against both general corrosion and pitting corrosion.

Further objects and advantages of the present invention will appear herein below.

SUMMARY OF THE INVENTION

In accordance with the present invention, a waterborne corrosion resistant primer composition broadly comprises a waterborne resin system; an optional curing agent; and a non-chromate containing corrosion inhibiting additive, wherein the non-chromate corrosion inhibiting additive comprises at least one of an anodic corrosion inhibitor and a cathodic corrosion inhibitor; and a metal complexing agent wherein the metal complexing agent increases the solubility of at least one of the anodic and cathodic corrosion inhibitors.

In yet another aspect of the present invention, an article comprising a metal substrate having a corrosion inhibiting coating comprising a waterborne corrosion resistant primer composition broadly comprising a waterborne resin system; an optional curing agent; and a non-chromate containing corrosion inhibiting additive, wherein the non-chromate corrosion inhibiting additive comprises at least one of an anodic corrosion inhibitor and a cathodic corrosion inhibitor; and a metal complexing agent wherein the metal complexing agent increases the solubility of at least one of the anodic and cathodic corrosion inhibitors.

In yet still another aspect of the present invention, a waterborne corrosion resistant self-priming composition broadly comprises a waterborne resin system; and at least one surface modification agent selected from the group consisting of inorganic acids, organic acids, organic coupling agents, phosphonates and siloxanes.

In yet still another aspect of the present invention, an article comprising a metal substrate having a corrosion inhibiting coating broadly comprises a waterborne corrosion resistant self-priming composition broadly comprising a waterborne resin system; and at least one surface modification agent selected from the group consisting of inorganic acids, organic acids, organic coupling agents, phosphonates and siloxanes.

The details of one or more embodiments of the invention are set forth in the accompanying drawings and the description below. Other features, objects, and advantages of the invention will be apparent from the description and drawings, and from the claims.

DETAILED DESCRIPTION

In accordance with the present invention, the non-carcinogenic corrosion inhibiting additive comprises, in combination, an anodic corrosion inhibitor and a cathodic corrosion inhibitor. By anodic corrosion inhibitor is meant suppression of metal oxidation reactions. By cathodic corrosion inhibitor is meant suppression of reduction reactions. In order to be effective, both the anodic and cathodic corrosion inhibitors should be "strong" corrosion inhibitors. By strong anodic corrosion inhibitor is meant a compound that is soluble in alkaline media, while precipitating as a reduced, insoluble oxide under neutral and acidic reducing conditions, that is, existing as an insoluble oxide below −600 mv vs. Ag/AgCl at pH 7, and below −300 mv vs. Ag/AgCl at pH 2. By a strong cathodic corrosion inhibitor is meant a compound that is soluble in acidic media, while undergoing a valance change to precipitate as an insoluble oxide under neutral and alkaline and moderately oxidizing conditions, that is, existing as an insoluble oxide above −300 mv vs. Ag/AgCl at pH 7, and above −900 mv vs. Ag/AgCl at pH 12. The corrosion inhibiting additive requires both an anodic corrosion inhibitor and a cathodic corrosion inhibitor in order to be effective against general corrosion and pitting corrosion. General corrosion means uniform dissolution of base metal. By pitting corrosion is meant localized corrosion of metal resulting in the formation of corrosion pits. The anodic corrosion inhibitor is effective against general corrosion while the cathodic corrosion inhibitor is particularly effective against pitting corrosion.

Suitable cathodic corrosion inhibitors for use in the inhibiting additive of the present invention include transition element metal salts. Particularly metal salts of the elements of Group IIIB of the Periodic Table (the CAS version). All of the foregoing elements have cathodic corrosion inhibiting characteristics; however, it has been found that cerium, neodymium and praseodymium are "strong" cathodic corrosion inhibitors as defined above and are therefore preferred Group IIIB elements. Particularly preferred cathodic corrosion inhibitors are compounds of cerium and, most preferred are cerous compounds. Suitable anodic corrosion inhibitors for use in the inhibiting additive of the present invention include elements from Groups VB and VIB of the Periodic Table, with the exception of hexavalent chromium, and more particularly include compounds of vanadium, molybdenum and tungsten and more particularly tungstate combined with molybdate compounds.

In accordance with the present invention a metal complexing agent is used in combination with the above described anodic and cathodic corrosion inhibitors. The metal complexing agent is preferably a water soluble organic acid salt and/or a water soluble inorganic acid salt. Particularly useful metal complexing agents are selected from the group consisting of citrate, gluconate, polyphosphate, tartrate, β-diketonates, α-hydroxy acids, D-fructose, L-sorbose and mixtures. The metal complexing agent should be present in an amount of between about 0.1 to 1.0, and preferably between about 0.3 to 0.7 with respect to the mole fraction of the combined anodic and cathodic corrosion inhibitors.

Preferred additives which are non-carcinogenic, effect against corrosion and exhibit excellent solubility include, for example, cerium citrate; cerium citrate with zinc molybdate, zinc oxide, and strontium tungstate; cerium citrate with molybdenum oxide and strontium tungstate, and mixtures thereof.

The corrosion inhibiting additive of the present invention may be added as an inhibitive pigment in adhesives, paints and primers, organic sealants, epoxies and the like (hereafter referred to as an organic carrier).

In one embodiment of the present invention, the waterborne corrosion resistant primer comprises a waterborne resin system selected from the group consisting of waterborne non-volatile dispersions of epoxies, urethanes, modified epoxy urethanes, fluoropolymers, modified epoxy fluoropolymers, phenolics, alkyds, latex, polyesters, rubbers, melamines, polyvinyl acetates, polyvinyl butyrals, polyvinyl chlorides, acrylics, combinations comprising at least one of the foregoing waterborne resin systems, and the like. In one embodiment of the present invention, the dispersion is based on a medium molecular weight wherein the dispersion is based on a medium molecular weight, polyfunctional resin dispersion, which on curing forms a high crosslink density polymer having very good hardness and resistance. The waterborne epoxy is present in an amount of about 5 to 50 wt. %, preferably between about 15 to 30 wt. % with respect to the final primer composition.

In a preferred embodiment, the waterborne resin system comprises a waterborne non-volatile dispersion of epoxies and modified epoxy containing resin systems. The epoxies and modified epoxy containing resin systems may have weight per epoxide (WPE) values between 450-700 and viscosity between 12000-19000 cps. In a further embodiment, the dispersion is based on an aqueous dispersion of a semisolid standard bisphenol A epoxy resin of high molecular weight epoxy resin.

In accordance with the present invention, the curing agent is selected from the group consisting of waterborne or water-reducible modified amine or polyamidoamine adducts having amine value between 300-450. In a preferred embodiment of the present invention, the curing agent further includes a hydrophobic curing agent to impact water in corrosion resistance. The curing agent is present in an amount of between about 2 to 20 wt. %, preferably about 5 to 15 wt. %, with respect to the final primer composition.

The chromate free waterborne epoxy corrosion resistant primer of the present invention is particularly useful in preventing general corrosion and pitting corrosion on metal substrates, particularly, alloys of aluminum, alloys of steel, stainless steels, high strength stainless steel alloys, and the like. The use of the chromate free waterborne epoxy of the present invention is useful in all industries including the aerospace industry, automotive industry, architectural industry, packaging industry, electronics industry, HVAC and marine.

In another embodiment of the present invention, the aforementioned waterborne corrosion resistant primer may be combined with a surface modification agent. Surface modification agents may be used to promote adhesion of a resin system, such as the waterborne resin system, to the metal of the article being coated. The use of a surface modification agent, combined with the aforementioned waterborne resin system, replaces the combination of a primer, surface treatment and optionally, the topcoat. Such a modification is not only cost effective, but also reduces process steps and promotes efficiency. Examples of such "wash primer" surface modification agents are described in WO 2004033523 A1 to Rodriguez et al., and assigned to E.I. duPont de Nemours and Company of Wilmington, Del. Suitable modification agents may include, but are not limited to, inorganic acids, organic acids, organic coupling agents, phosphonates, siloxanes, combinations comprising at least one of the foregoing, and the like, which are known to one of ordinary skill in the art. For example, at least one suitable inorganic acid is phosphoric acid.

The corrosion inhibiting properties of the chromate free waterborne epoxy corrosion resistant primer of the present invention will be made clear from the following example.

These products may be applied to the substrate which is being protected by any suitable manner known in the art such as spraying, brushing, or the like. In addition, the corrosion inhibiting additive, whose solubility is increased by the metal complexing agent, is dissolved in a carrier such as alcohol, water or the like and formed on the surface of a substrate as a conversion coating. In either case, that is, as an additive to adhesive, paints and primers, epoxies and the like, the corrosion inhibiting additive is provided in a solution comprising a carrier and the corrosion inhibiting additive. In the first case described above with regard to paints and primers, etc., the carrier may be at least an organic binder.

When the corrosion inhibiting additive is used as an additive to solutions such as adhesives, paints and primers, sealants, epoxies and the like (herein referred to as organic carriers), it is preferred that the additive be present in an amount of between about 5 to 12 vol. % and the minimum amount of anodic corrosion inhibitor plus cathodic corrosion inhibitor is at least about 1 vol. % and the metal complexing agent is present in at least about 0.1 mole fraction of combined inhibitor. It is preferred that molar solubility in water of the anodic corrosion inhibitor and the cathodic corrosion inhibitor lie between about $1E^{-6}$ and $1E^{-3}$ mol/liter.

The chromate free, waterborne corrosion resistant primer is particularly useful in preventing general corrosion and pitting corrosion on metal substrates, particularly, high strength aluminum alloys for use in the aerospace industry. The chromate free, waterborne corrosion resistant primer may be applied in any manner known in the art including a primer as intended, or as an adhesive, paint, organic sealant, sealer for anodized aluminum, and the like, obviously the use of the chromate free, waterborne corrosion resistant primer of the present invention extends to other fields outside of aerospace and includes automotive, architectural, packaging, electronics, HVAC and marine.

One or more embodiments of the present invention have been described. Nevertheless, it will be understood that various modifications may be made without departing from the spirit and scope of the invention. Accordingly, other embodiments are within the scope of the following claims.

What is claimed is:

1. A waterborne corrosion resistant primer composition, consisting of:
    a waterborne resin system;
    a curing agent selected from the group consisting of a waterborne amine, a water-reducible modified amine, polyamidoamine adducts having amine value between 300-450 and a hydrophobic curing agent for enhanced water and corrosion resistance; and,
    a non-chromate containing corrosion inhibiting additive, wherein the non-chromate corrosion inhibiting additive consists of an anodic corrosion inhibitor and a cathodic corrosion inhibitor; and
    a metal complexing agent selected from the group consisting of water soluble organic acid salts, water soluble inorganic acid salts, citrate, gluconate, polyphosphate, tartrate, β-diketonates, α-hydroxy acids, D-fructose, L-sorbose and mixtures thereof,
    wherein the metal complexing agent increases the solubility of the anodic and cathodic corrosion inhibitors and the metal complexing agent is present in an amount of between 0.1 to 1.0 with respect to the mole fraction of the combined anodic and cathodic corrosion inhibitor.

2. The primer according to claim 1, wherein said waterborne resin system comprises a waterborne non-volatile dispersion of a resin selected from the group consisting of epoxies, urethanes, modified epoxy urethanes, fluoropolymers, modified epoxy fluoropolymers, phenolics, alkyds, latex, polyesters, rubbers, melamines, polyvinyl acetates, polyvinyl butyrals, polyvinyl chlorides and acrylics.

3. The primer according to claim 2, wherein the dispersion is based on a polyfunctional resin dispersion, which on curing forms a high crosslink density polymer having very good hardness and resistance.

4. The primer according to claim 2, wherein the dispersion is based on an aqueous dispersion of said resin.

5. The primer according to claim 2, wherein said resin is present in an amount of between 5 to 50 wt. % with respect to the primer composition.

6. The primer according to claim 2, wherein said resin is present in an amount of between 15 to 30 wt. % with respect to the primer composition.

7. The primer according to claim 1, wherein said curing agent is present in an amount of between 2 to 20 wt. % with respect to the primer composition.

8. The primer according to claim 1, wherein said curing agent is present in an amount of between 5 to 15 wt. % with respect to the primer composition.

9. The primer according to claim 1, wherein the metal complexing agent is present in an amount of between 0.3 to 0.7 with respect to the mole fraction of the combined anodic and cathodic corrosion inhibitor.

10. The primer according to claim 1, wherein the cathodic corrosion inhibitor is selected from the group consisting of rare earth metal compounds and the anodic corrosion inhibitor is selected from the group consisting of transition metal salts.

11. The primer according to claim 1, wherein the cathodic corrosion inhibitor is selected from the group consisting of metal salts of the element of Group IIIB of the Periodic Table (CAS version) and the anodic corrosion inhibitor is a compound of an element selected from the group consisting of elements of Groups VB and VIB of the Periodic Table (CAS version).

12. The primer according to claim 1, wherein the cathodic corrosion inhibitor is selected from the group consisting of cerous compounds and the anodic corrosion inhibitor is selected from the group consisting of molybdate, tungstate, vanadate and mixtures thereof.

13. The primer according to claim 1, wherein the corrosion inhibiting additive is selected from the group consisting of cerium citrate; cerium citrate with zinc molybdate, zinc oxide, and strontium tungstate; cerium citrate with molybdenum oxide and strontium tungstate, and mixtures thereof.

14. An article comprising a metal substrate having a corrosion inhibiting coating comprising a waterborne corrosion resistant primer composition consisting of a waterborne resin system; a curing agent selected from the group consisting of a waterborne amine, a water-reducible modified amine, polyamidoamine adducts having amine value between 300-450 and a hydrophobic curing agent for enhanced water and corrosion resistance; and a non-chromate containing corrosion inhibiting additive, wherein the non-chromate corrosion inhibiting additive consists of an anodic corrosion inhibitor and a cathodic corrosion inhibitor; and a metal complexing agent selected from the group consisting of water soluble organic acid salts, water soluble inorganic acid salts, citrate, gluconate, polyphosphate, tartrate, β-diketonates, α-hydroxy acids, D-fructose, L-sorbose and mixtures thereof, wherein the metal complexing agent increases the solubility of the anodic and cathodic corrosion inhibitors and the metal complexing agent is present in an amount of between 0.1 to 1.0 with respect to the mole fraction of the combined anodic and cathodic corrosion inhibitor.

15. The article according to claim 14, wherein the anodic corrosion inhibitor plus cathodic corrosion inhibitor are present in an amount of between 1 to 50 wt. %.

16. A waterborne corrosion resistant self-priming composition, consisting of:
   a waterborne resin system;
   a curing agent selected from the group consisting of a waterborne amine, a water-reducible modified amine, polyamidoamine adducts having amine value between 300-450 and a hydrophobic curing agent for enhanced water and corrosion resistance;
   a non-chromate containing corrosion inhibiting additive, wherein the non-chromate corrosion inhibiting additive consists of an anodic corrosion inhibitor and a cathodic corrosion inhibitor;
   a metal complexing agent selected from the group consisting of water soluble organic acid salts, water soluble inorganic acid salts, citrate, gluconate, polyphosphate, tartrate, β-diketonates, α-hydroxy acids, D-fructose, L-sorbose and mixtures thereof, and
   at least one surface modification agent selected from the group consisting of inorganic acids, organic acids, organic coupling agents, phosphonates, siloxanes and combinations thereof,
   wherein the metal complexing agent increases the solubility of the anodic and cathodic corrosion inhibitors and the metal complexing agent is present in an amount of between 0.1 to 1.0 with respect to the mole fraction of the combined anodic and cathodic corrosion inhibitor.

17. The self-priming composition according to claim 16, wherein said waterborne resin system comprises a waterborne non-volatile dispersion of a resin selected from the group consisting of epoxies, urethanes, modified epoxy urethanes, fluoropolymers, modified epoxy fluoropolymers, phenolics, alkyds, latex, polyesters, rubbers, melamines, polyvinyl acetates, polyvinyl butyrals, polyvinyl chlorides and acrylics.

18. The self-priming composition according to claim 17, wherein the dispersion is based on a polyfunctional resin dispersion, which on curing forms a high crosslink density polymer having very good hardness and resistance.

19. The self-priming composition according to claim 17, wherein the dispersion is based on an aqueous dispersion of said resin.

20. The self-priming composition according to claim 17, wherein said resin is present in an amount of between 5 to 50 wt. % with respect to the primer composition.

21. The self-priming composition according to claim 17, wherein said resin is present in an amount of between 15 to 30 wt. % with respect to the primer composition.

22. An article comprising a metal substrate having a corrosion inhibiting coating comprising a waterborne corrosion resistant self-priming composition consisting of a waterborne resin system; a curing agent selected from the group consisting of a waterborne amine, a water-reducible modified amine, polyamidoamine adducts having amine value between 300-450 and a hydrophobic curing agent for enhanced water and corrosion resistance; a non-chromate containing corrosion inhibiting additive, wherein the non-chromate corrosion inhibiting additive consists of an anodic corrosion inhibitor and a cathodic corrosion inhibitor; a metal complexing agent selected from the group consisting of water soluble organic acid salts, water soluble inorganic acid salts, citrate, gluconate, polyphosphate, tartrate, β-diketonates, α-hydroxy acids, D-fructose, L-sorbose and mixtures thereof, and at least one surface modification agent selected from the group consisting of inorganic acids, organic acids, organic coupling agents, phosphonates, siloxanes and combinations thereof, wherein the metal complexing agent increases the solubility of the anodic and cathodic corrosion inhibitors and the metal complexing agent is present in an amount of between 0.1 to 1.0 with respect to the mole fraction of the combined anodic and cathodic corrosion inhibitor.

\* \* \* \* \*